July 8, 1947.  L. H. MIDDLETON ET AL  2,423,609
BELLOWS OPERATED RHEOSTAT
Filed Nov. 10, 1944
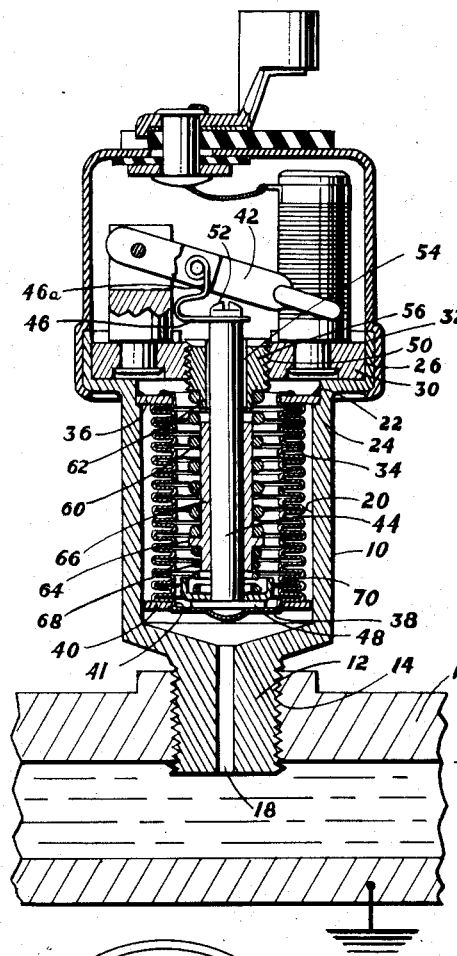
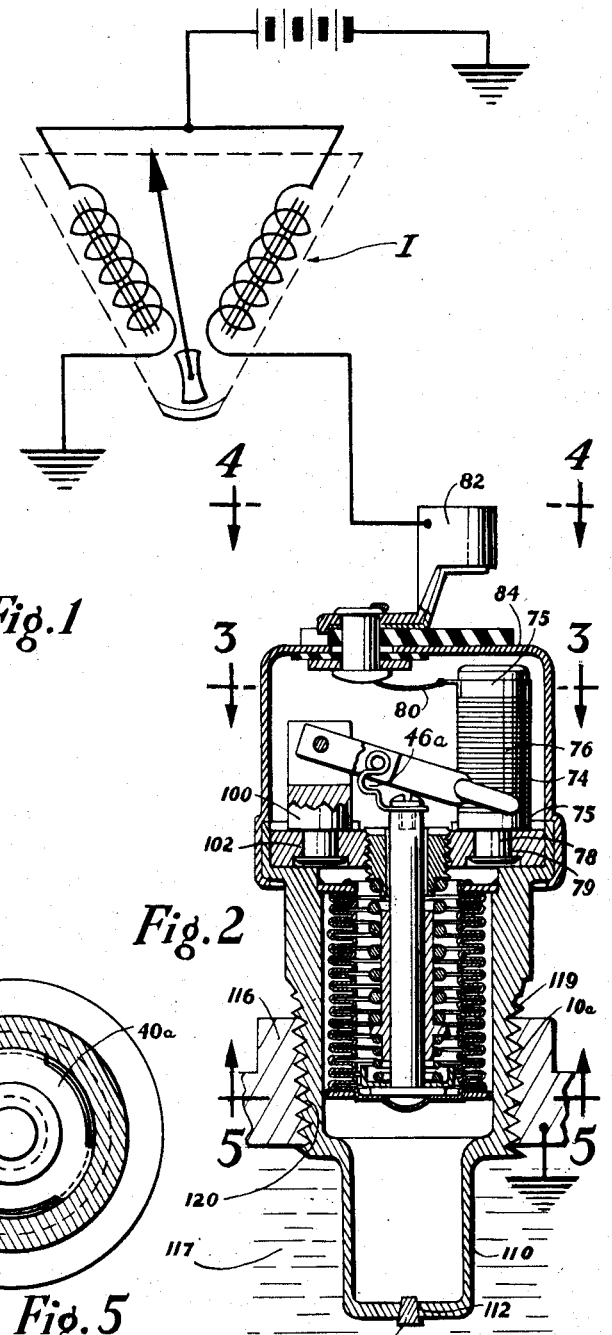
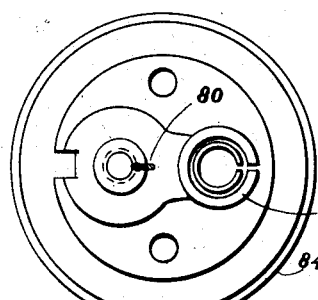
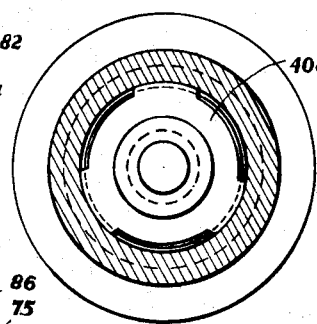
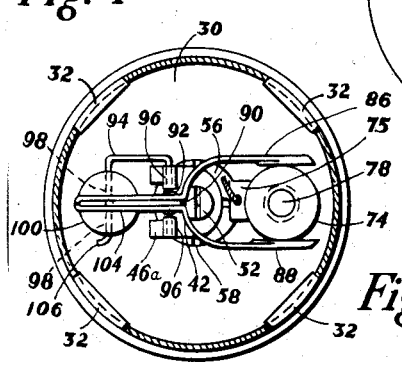
Fig. 1
Fig. 2
Fig. 3
Fig. 4
Fig. 5
INVENTOR.
LESLIE H. MIDDLETON AND
EDWARD A. KERN
BY
Falvey, Souther & Stoltenberg
ATTORNEYS Patented July 8, 1947

2,423,609

UNITED STATES PATENT OFFICE 2,423,609

BELLOWS OPERATED RHEOSTAT

Leslie H. Middleton, Toledo, and Edward A. Kern, Weston, Ohio

Application November 10, 1944, Serial No. 562,898

3 Claims. (Cl. 201—48)

This invention relates to telemetric measuring systems, more particularly to initiating devices including a variable rheostat actuated by changes in pressure.

This invention contemplates the provision of an initiating device for use in telemetric circuits of an automobile, particularly temperature and oil pressure of the engine, which is generally applicable to either type of service so that mass production of the separate parts will be facilitated and cheapened. The device is provided with an actuating chamber having a movable member mounted therein in the form of a bellows, which collapses when subject to pressure change in the actuating chamber: as, for example, in the temperature measuring device, this change of pressure is brought about by an expansible filling subject to temperature change, while in the oil pressure measuring device, the oil whose pressure is to be measured enters the actuating chamber directly. The bellows is then connected to a rheostatic device whose resistance is varied in proportion to the movement of the bellows by a novel driving means which is identical in the two measuring devices, and applicable to many other similar devices. Further provision is made in the driving means for relatively uniform deflection over a wide range of conditions and still allow accurate indication at low values by the use of dual spring loading and stop means.

It is, therefore, a principal object of this invention to provide a driving means for a telemetric rheostatic device which is simple in structure and reliable in operation and which is applicable to many different types of telemetric initiating devices.

It is a further object of this invention to provide a pressure responsive rheostatic device which is spring loaded and provided with co-operating stop means which will give an accurate deflection at low values of pressure but yet will have a wide range for measuring pressures.

It is a further object of this invention to provide an initiating device for telemetric measuring instruments which is applicable in measuring several different types of primary physical effects, such as engine temperature and engine oil pressure.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is a sectional elevation of a pressure responsive type.

Fig. 2 is a view similar to Fig. 1 of a temperature responsive type including a schematic diagram of connections of a typical telemetric circuit.

Fig. 3 is a view taken along the line 3—3 of Fig. 2.

Fig. 4 is a view taken along the line 4—4 of Fig. 2.

Fig. 5 is a view taken along the line 5—5 of Fig. 2.

Referring to the drawings, particularly to Fig. 1, an initiating device is shown which is designed to be responsive to fluid pressure such as oil pressure of an engine to which the initiating device may be applied. A metallic cylindrical casing 10 is provided having a concentric threaded boss 12 on its lower end which is fitted into a threaded aperture 14 of a fluid pressure conduit 16 with which the casing 10 is in communication by means of a concentric bore 18. The casing 10 is provided with a counterbore 20, which is made smooth and free of tool marks, and at its upper end is provided with a second counterbore 22 to provide a shoulder 24 whose purpose will be described hereinafter. The upper end of the casing 10 is provided with a concentric enlarged portion 26 forming a concentric shoulder 28 on which is positioned a circular plate 30 fitting snugly within the enlarged portion 26 whose lip 32 may be turned in as shown in Fig. 3 at four symmetrically disposed points to hold the plate 30 in position in the case. The plate 30 carries the elements of a variable rheostatic device as will be described in further detail hereinafter.

The fluid pressure in the conduit 16 is communicated to the counterbore 20 of the casing 10 by bore 18, and is contained therein by means of a collapsible metallic bellows 34 of somewhat smaller diameter than the counterbore 20. The bellows 34 is attached at its upper end as by soldering to a ring washer 36 which fits snugly into the second counterbore 22 and is fitted against the shoulder 24 and sealed by soldering the ring to the casing 10. This suspends the bellows in concentric relation with the counterbore 20, and forms a compression chamber for the fluid pressure, inasmuch as the lower end of the bellows is closed by integral end wall 38. As the fluid pressure builds up in the compression chamber, the bellows will collapse so that its end wall 38 will be moved toward the ring washer 36 forming an anchor for the bellows in the casing 10.

In order to guide the collapsing movement of the bellows when under influence of fluid pressure active on its exterior as contained in the pressure chamber, a slotted washer 40 is provided which is conveniently soldered to the lower end of the bellows to a boss 41 formed in the end wall 38 of the bellows. The perimeter 40a of the slotted washer 40 cooperates (Fig. 5) with the smooth counterbore 20 forming the interior surface of the casing 10 to guide the longitudinal movement of the collapsing bellows to maintain straight line movement thereof.

The straight line movement of the bellows 34 under the influence of the fluid pressure in the pressure chamber is used to drive a movable arm 42 of a variable rheostatic device attached to the plate 30, through the agency of a rod 44 which is connected by a bendable or flexible link 46 to the arm 42 and to the bellows end wall 38 at its lower end by a circular plate 48 which is preferably riveted to the rod 44 and soldered to the end wall 38 to attach the rod permanently thereto. The length of the rod 44 is such that it extends beyond the upper surface of the plate 30, through threaded aperture 50, when the bellows 34 is in fully extended position. At the upper end of the rod 44 the link 46 of relatively flexible spring material bendable through the use of tools is attached by screw 52 fitted into a threaded aperture in the end of the rod. As the bellows is collapsed by the action of the fluid pressure, the rod will be thrust upwardly to actuate the movable arm of the variable rheostat, the rod being guided by a central concentric aperture 54 in a threaded adjusting plug 56 fitted into aperture 50. The upper end of the plug 56 is provided with a kerf 58 to allow longitudinal adjustment thereof in threaded aperture 50 which varies the tension of a relatively heavy loading spring 60, one end of which embraces a flange 62 on the plug. The other end of spring 60 engages an integral flange 64 on a sliding sleeve 66 mounted loosely on rod 44 for longitudinal movement thereon. The flange 64 is positioned adjacent the lower end of the sleeve 66 and seats on its other or lower side an end of a second relatively weak loading spring 68, the other end of which seats in a cup 70, buttressed by the plate 48 on the end head 38 of the bellows.

The ends of the sliding sleeve 66 are adapted to cooperate with the cup 70 and the flange 62 respectively to form stops to control the deflection of the loading springs 68 and 60, and also to control the total deflection of the bellows 34 to prevent rupture thereof in the event the fluid pressure builds up to destructive values. As the bellows begins to deflect under the influence of the fluid pressure, its own inherent resistance plus the resistance of the weak loading spring 68 is first overcome, the deflection of the bellows continuing until the cup 70 abuts against the lower end of the sliding sleeve 66, at which time the resistance of weak loading spring 68 ceases and the heavier loading spring 60 takes up the load and begins to deflect. The deflection continues against the resistance of the heavy spring until the upper end of the sliding sleeve contacts the flange 62, which limits the movement of the bellows 44 and determines the maximum deflection thereof. The elements are self-retractive when the pressure values recede and the procedure is reversed. This allows the use of a scale in a remote indicating instrument I (Fig. 2) which has a large displacement of units at low values and still a wide range of readings by small displacement of units at high values.

As has already been pointed out, the rod 44 is connected to the sliding or movable arm 42 of a variable rheostatic device comprising a hollow cylindrical insulating drum 74 provided with end contact cups 75, the drum preferably being made of ceramic material about which is wrapped resistance wire 76 whose ends are soldered to the cups 75, the whole assembly being attached to plate 30 in insulated relation by a hollow rivet 78 fitted into an aperture 79 therein and extending through the drum 74 and riveted over at its top end. The upper end of the resistance wire is connected in the telemetric circuit, as shown in Fig. 2, by a wire 80 soldered to a binding post 82 mounted in insulated relation in a cover member 84, as is well known in the art, and to the upper contact cup 75. The lower end of the resistance wire is free or grounded but, if desired, may also be led to a second binding post (not shown) in the cover member if the device is to be used in a potentiometer circuit. The sliding arm is in contact with bare portions of the resistance wire to make contact therewith as it moves up and down under the influence of the rod 44. Contact pressure between the sliding arm and the resistance wire is maintained by bifurcating the arm into two embracing spring contact portions 86 and 88 which contact the resistance wire on the drum at substantially diametrically opposed points, being sprung outwardly from their normal relation when in contact with the drum.

The two contact portions 86 and 88 are held together (Fig. 3) by being attached together with a central plate 90 by a hollow rivet 92 which forms a journal for one arm of a U-shaped pin 94 by which the link 46 is attached to the contact arm through a pivot formed in a bifurcated portion 46a having aligning loops 96 embracing the pin 94 on opposite sides of the hollow rivet 92. The position of the contact arms 86 and 88 on the resistance wire 76 at a specific pressure can be adjusted by bending, through the use of tools, the spring material of the link 46. The second parallel arm of the U-shaped pin 94 is fitted into aligning apertures 98 formed in a slotted stud 100 which is riveted in an aperture 102 to the plate 30 by its lower end. The slot 104 is aligned with the center of the rod 44 and the center of the drum 74, and ends of the contact portions 86 and 88 and the central plate 90 extend into the slot and are provided with aligning apertures through which the second arm of the U-shaped pin 94 extends to form a pivot about which the whole movable arm assembly 42 moves. A centering action is obtained in the slot 104 by having the ends of the contact portions 86 and 88 sprung inwardly from their normal position by the sides of the slot so that the plate 90 is maintained in a central location in the slot to obviate binding by cocking or the like. The apertures in these contact portions 86 and 88 at this point are slightly elongated to facilitate this action. The U-shaped pin 94 is held in position in the apertures 98 by having its end 106 bent laterally as shown in Fig. 3.

As the rod 44 is thrust upwardly by the collapsing of the bellows 34 under the influence of fluid pressure, the flexible link 46 transmits this force to the contact arm 42 to move the arm about its pivot formed in the stud 100, this movement being magnified at the end where the contact members 86 and 88 are in contact with the resistance wire 76 on the drum 74, so that the resistance in the telemetric circuit is varied in proportion to the fluid pressure active in the pressure chamber, which is reflected by the position of the pointer of the indicating instrument I.

In the temperature responsive initiating device shown in Fig. 2, the bellows, linkage and variable rheostatic device are the same as in the pressure responsive device already described. The casing 10a in this device is provided with an integral depending cup 110 having a small aperture 112 in its floor by which entry may be made into the compression chamber which includes the cup portion 110. The compression chamber is completely filled with a liquid having suitable expansion characteristic or vapor pressure characteristic under temperature change to cause the bellows 34 to collapse in proportion to the temperature change to give a true indication of such change at the indicating instrument I. Ethyl ether is such a suitable liquid having a suitable change in vapor pressure at the temperatures to be measured and after the compression chamber is completely filled, a plug 114 is soldered in aperture 112 to close the same.

In order to attach the device to the wall 116 of a chamber 117 containing the fluid whose temperature is to be measured, the casing 10a is threaded at 119 to cooperate with a threaded aperture 120 in the wall 116. This places the cup 110 into contact with the fluid, so that the temperature of the ethyl ether is the same as that of the fluid, and expands or contracts in accordance therewith to react on the bellows 34.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a pressure responsive bellows, a pressure chamber cooperating with the bellows having a relation to the physical effect to be measured, a variable rheostatic device including a movable arm, a central rod movable by the bellows to actuate the movable arm of the rheostatic device, a sliding sleeve on the central rod to provide a movable abutment, a pair of loading springs cooperating with the abutment and active between the bellows and a fixed portion attached to one end of the bellows, variable stop means embracing the rod and adapted to cooperate with the ends of the sleeve to provide a sequential operation for the loading springs and to limit the maximum deflection of the bellows.

2. In a device of the class described, a pressure responsive bellows anchored adjacent one end, a pressure chamber cooperating with the bellows to contain a fluid pressure to move the bellows with reference to its anchored end in accordance with the physical effect being measured, a variable rheostatic device fixed adjacent to the anchored end of the bellows including a movable arm, guide means for the bellows to maintain straightline deflection thereof, said guide means including a member coacting with the walls of said pressure chamber attached to the free end of the bellows, a central rod actuated by said bellows terminating adjacent the movable arm of the rheostatic device, flexible linkage means connecting the rod to the movable arm whereby the rod may drive the arm when the bellows is deflected, a pair of loading springs cooperating with the bellows adapted to react sequentially in accordance with their relative strengths and stop means cooperating with the springs and the bellows to determine the active periods of the springs having reference to deflection of the bellows and also to predetermine the maximum deflection of the bellows.

3. In a device of the class described, a pressure responsive bellows anchored adjacent one end, a pressure chamber cooperating with the bellows to contain a fluid pressure to move the bellows with reference to its anchored end in accordance with the physical effect being measured, a variable rheostatic device fixed adjacent to the anchored end of the bellows including a movable arm, guide means carried by the free end of the bellows to maintain straightline deflection thereof, a central rod attached to the free end of the bellows and terminating adjacent the movable arm of the rheostatic device, flexible linkage means connecting the rod to the movable arm whereby the rod may drive the arm when the bellows is deflected, a pair of loading springs mounted on the rod to cooperate with the bellows adapted to react sequentially in accordance with their relative strengths, and stop means cooperating with the rod, the bellows and its anchor to determine the deflection of the springs having reference to the deflection of the bellows and also to predetermine the maximum deflection of the bellows.

LESLIE H. MIDDLETON.
EDWARD A. KERN.

REFERENCES CITED

The following references are of record in the file of this patent:

UNITED STATES PATENTS

| Number | Name | Date |
|---|---|---|
| 1,089,081 | Ray | Mar. 3, 1914 |
| 1,686,796 | Case | Oct. 9, 1928 |
| 1,942,496 | Siegel | Jan. 9, 1934 |
| 2,283,378 | Liner | May 19, 1942 |
| 2,373,591 | Nixon | Apr. 10, 1945 |

FOREIGN PATENTS

| Number | Country | Date |
|---|---|---|
| 384,671 | Germany | Nov. 5, 1923 |